United States Patent Office 3,555,038
Patented Jan. 12, 1971

3,555,038
PREPARATION OF TRIORGANOLEAD COMPOUNDS BY OZONOLYSIS
Louis C. Willemsens, Utrecht, Netherlands, assignor to International Lead Zinc Research Organization, Inc., New York, N.Y., a membership corporation of New York
No Drawing. Filed Dec. 18, 1967, Ser. No. 691,250
Claims priority, application Netherlands, Dec. 29, 1966, 6618311
Int. Cl. C07f 7/24; C11c 1/00; C07d 105/00
U.S. Cl. 260—299                                     15 Claims

ABSTRACT OF THE DISCLOSURE

A process for preparing triorganolead compounds having the general formula $R_3PbX$, wherein R is an alkyl, aryl, aralkyl or cycloalkyl radical, and X is an anion easily bonded to lead, comprising reacting a hexaorganodilead compound $R_6Pb_2$ with ozone and a compound HX in a suitable solvent.

---

This invention relates to a process for preparing triorganolead compounds.

It is an object of this invention to provide a process for preparing triorganolead compounds of the general formula $R_3PbX$, in which R is an alkyl, aryl, aralkyl or cycloalkyl radical, and X is an anionic radical which is easily bonded to lead.

According to the present invention, the process for the preparation of triorganolead compounds $R_3PbX$ is characterized by treating a hexaorganodilead compound $R_6Pb_2$ in a solvent with ozone and with a compound HX:

$$R_3Pb-PbR_3 + O_3 + 2HX \rightarrow 2R_3PbX + O_2 + H_2O$$

The simplest manner to bring about the reaction of the ozone is by introducing the gas mixture issuing from an ozonizer into a solution of the substance $R_6Pb_2$. Generally speaking, the concentration of the ozone in such a gas mixture is only a small percentage of the total mixture. The concentration may vary, however, from at least about 0.01%. It has been observed that no reaction occurs when pure oxygen alone is used.

The reaction mechanism is not known, but from the final result it can be deduced as being a selective cleavage of the Pb–Pb bond and the addition of the X radical to the free valency of the lead atom.

The hexaorganolead compounds may be aryl, alkyl, aralkyl, and cycloalkyl compounds. R may be an alkyl radical, such as propyl, butyl, iso-butyl, sec-butyl, heptyl, octyl, and dodecyl; or an aryl radical, such as mono- and dicarbocyclicaryl, phenyl, naphthyl; or aralkyl, such as tolyl and benzyl; or cycloalkyl, such as cyclohexyl.

The anionic radical X may be an acylate radical, such as acetate, or benzoate; a halide, such as chloride, bromide or iodide; a methylmercaptide, a benzylmercaptide $(C_6H_5CH_2S)$, a phenylmercaptide $(C_6H_5S)$, an imidazolyl, an azide, a cyanide radical, or the like. Other examples are methylate, halogen substituted acetyl, sulfate, nitrate, azide, triazolyl, nitrogen-containing heterocyclic,

—OCOCH($CH_3$)$C_4H_9$ and —OCOC$_{11}$H$_{23}$ radicals. These and similar groups are easily bonded to a lead atom.

When X is a hydroxyl, HX becomes $H_2O$. In this instance, instead of triorganolead salts being formed, triorganolead hydroxide ($R_3PbOH$) is obtained. X may also represent half of a sulfur atom. This results in the formation of ($R_3Pb$)$_2S$.

The nature of the solvent is not important. No systematic influence of the chosen solvent on the course of the reaction has been found. The solvent should meet the obvious requirement that it is not excessively attacked by the ozone at the reaction temperature. Suitable solvents include diethylether, chloroform, tetrahydrofuran and aliphatic hydrocarbons. The concentration of the substances in the solvent is not important.

As to the temperature at which the ozone is introduced into the solvent, it has been found that the temperature does not significantly influence the course of the reaction. The reaction proceeds smoothly both at higher temperatures and at minus 65° C. or lower. No difference of any importance could be established, either with relation to the secondary reactions. Under any temperature conditions the ozone is quickly absorbed by the solution.

Although the compound HX may be added to the solution before treatment with ozone, it is also possible to add HX after the solution has been ozonated. If the HX reacts strongly with ozone or with $R_6Pb_2$, it is preferred to use the latter method. In connection with the determination of the terminal point of the ozone absorption, it will often be preferable to have HX (especially if an acid) present in the solution during the ozone treatment. This will be explained hereinafter.

A quantity of 1 mole of ozone per mole of $R_6Pb_2$ is absorbed at once. When there is a smaller quantity of ozone, the development of the reaction is incomplete and the reaction mixture contains an excess of starting material.

Under standardized conditions it is possible to introduce an apportioned quantity of ozone. In practice, use is made of an ozonizer, which may deliver a gas mixture that is not completely constant. It is possible, however, to establish the point at which exactly 1 mole of $O_3$ per mole of $R_6Pb_2$ has been absorbed. The vast majority of $R_6Pb_2$ solutions are yellow. When ozone is being introduced, the disappearance of the yellow color indicates the exact moment at which the correct quantity of ozone has been absorbed. A complication may arise in that some colloidal yellowish lead oxide may be formed in the presence of a slight excess of ozone which interferes with the establishment of the end point. This does not happen if an acid of the type HX is present during the treatment with ozone. This method, therefore, is preferred in practice. Otherwise, the end point may also be determined by treating a sample with a few drops of a weak solution of potassium permanganate in acetone. As long as $R_6Pb_2$ is present the purple color immediately turns into brown.

The properties of the compounds $R_3PbX$, $R_6Pb_2$, and $R_4Pb$ (which sometimes occurs in hexaorganodilead compounds as an impurity) are known, including their solubility in various solvents and their ability to crystallize out selectively. Also, the processing of the reaction mixture following treatment with ozone to determine and isolate the $R_3PbX$ product is well known in the art.

Below is a list of compounds which may be prepared according to the ozonization process:

$(C_3H_7)_3Pb$—
    Cl*: m. 137°
    Acetate: m. 128°
    o-$NH_2C_6H_4OC$: m. 57–8°
    $NHSO_2Ph$: m. 96°
    2-$SO_3C_{10}H_7$*: m. 127–7°

$(C_4H_9)_3Pb$—
    Br*: m. 30–4°
    Acetate: m. 86°
    $OCOCH_2CH_2Cl$: m. 72–3°
    OCOCHEtBu: m. 72–6°
    $OCOC_{11}H_{23}$: m. 6°, $n_D^{20}$ 1.5019
    $OCOCMe=CH_2$: m. 75–7°
    Adipate: m. 152–3°
    $SCH_2COO$-iso-$C_9H_{19}$: oil
    NHCN: oil
    Imidazole: m. 48–50°
    Benzotriazole: m. 103°
(Iso-Bu)$_3$PbOAc: m. 101–10°
(Cyclohexyl)$_3$PbOAc: dec.±120°
(n-$C_{12}H_{25})_3$PbOAc: m. 64°

$Ph_3Pb$—
    Cl*: m. 210°
    Acetate: m. 204–6°
    OH: dec. 138–144°
    $OCOC_{17}H_{35}$: m. 101–9°
    OCOC=CPh: dec. 125–7°
    p-$OHC_6H_4COCO$: m. 162–4°
    $OCOCH_2CN$: dec. 147–55°
    $NO_3$*: dec. 220–5°
    OPh: m. 114–15°
    SMe*: m. 108–9°
    p-$SC_6H_4Cl$*: m. 102.5°
    SAc*: m. 90–1°
    $SP(S)(OMe)_2$*: m. 89–91°
    1,2,4-triazole: dec. ±265°
(p-$MeC_6H_4)_3$PbOAc: m. 161–2°
$(PhCH_2CH_2)_3PbBr$*: m. 222°
(Mesityl)$_3$PbBr*: m. 145–6°
(p-$MeOC_6H_4)_3$PbBr*

Temperatures are in ° C.

With the compounds marked by an asterisk, the acid is preferably added after the ozonization; in all remaining cases this makes no difference.

In the examples compiled below, the yield in $R_3PbX$ is calculated on the amount of $R_6Pb_2$ which had been introduced into the solution.

The abbreviations have the following meaning:

Pr=n-propyl
OAc=acetate
Bu=n-butyl
$C_7H_{15}$=n-heptyl
$C_{12}H_{25}$=n-dodecyl
Ph=phenyl
BzOH=benzoic acid

EXAMPLE I $Pr_6Pb_2$ (0.05 mole) and 0.1 mole of HOAc were dissolved in 250 cm.³ of dry ether. An ozone-containing gas mixture was introduced at 10° C. After discoloration of the liquid the ozone supply was stopped. A very slight cloudiness was filtered off and the solution was evaporated to dryness. The residue was recrystallized from acetone. The yield in $Pr_3PbOAc$ was 85%; the melting point was 127–128° C.

EXAMPLE II $Bu_6Pb_2$ (0.05 mole) and 0.1 mole of HOAc were dissolved in 300 cm.³ of dry ether. Ozone was introduced at minus 65° C., the further treatment being analogous to that contained in Example I. The recrystallization from acetone yielded 90% of $Bu_3PbOAc$, and the melting point was 85.5° C.

EXAMPLE III

Example II was repeated; but the temperatures of the solution into which the ozone was introduced were different. The results were as follows:

| Temperature, ° C. | Percent $Bu_3PbOAc$ |
|---|---|
| −60 | 86 |
| −30 | 84 |
| −5 | 83 |
| +5 | 86 |
| +15 | 88 |

The variations in the yields are not caused by variations in temperature, but are the result of recrystallization losses and of a small quantity of $Bu_4Pb$, with which the starting product $Bu_6Pb_2$ is sometimes contaminated.

It was found that in the other reactions no systematic temperature effect occurred. In addition, it appeared that the reaction was not a dangerous one so that no special measures with regard to the temperature had to be taken. Nothing in the nature of a so-called "solvent effect" has been found. Therefore, a solvent may be chosen to suit the convenience of the practitioner. Apparaently, ozone reacts very quickly and very selectively with the lead-lead bond.

EXAMPLE IV $Bu_6Pb_2$ (0.05 mole) was dissolved in 350 cm.³ of dry ether and 0.05 mole of ozone was introduced at 5° C. Then 0.1 mole of benzoic acid was added. The yield in tributylleadbenzoate was 90%; the melting point was 76–77°. This substance is new.

EXAMPLE V $(C_7H_{15})_6Pb_2$ (0.05 mole) and 0.1 mole of acetic acid were dissolved in 500 cm.³ of dry ether; 0.05 mole of ozone was introduced at 10° C. Evaporation to dryness and recrystallization from acetone gave 91% of $(C_7H_{15})_3PbOAc$ having a melting point of 25–30° C.

EXAMPLE VI $(C_{12}H_{25})_6Pb_2$ (0.05 mole) was 0.1 mole of HOAc were dissolved in 500 cm.³ of chloroform; 0.05 mole of ozone was introduced at 17° C. Recrystallization from benzene gave 88% of $(C_{12}H_{25})_3Pb$ 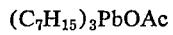 (OAc) with a melting point of 64° C. This substance is novel.

EXAMPLE VII $Ph_6Pb_2$ (0.05 mole) and 0.1 mole of HOAc were dissolved in 400 cm.³ of tetrahydrafuran and 0.05 mole of ozone was introduced at 10° C. Recrystallization from acetone gave 94% of $Ph_3Pb$ (OAc) with a melting point of 204–206° C.

EXAMPLE VIII

Example VII was repeated while using 400 cm.³ of chloroform instead of 400 cm.³ of tetrahydrofuran. The yield was 97%. No particular significance should be attached to the difference in yield as compared with Example VII.

EXAMPLE IX $Ph_6Pb_2$ (0.05 mole) was dissolved in 400 cm.³ of chloroform. Ozone (0.05 mole) was introduced at 15° C. Subsequently, 0.1 mole of imidazole was added. After processing, 92% of triphenylleadimidazole was obtained. The melting point under decomposition was about 285° C.

EXAMPLE X $Ph_6Pb_2$ (0.05 mole) was dissolved in 400 cm.³ of chloroform; 0.05 mole of ozone was introduced at 5° C. After that, 0.1 mole of water was added, and the triphenyllead hydroxide crystallized out. The yield was 94% and the substance melted under decomposition at 138–144° C. The hydroxide was converted into the acetate by reaction with acetic acid, with a melting point of 203–205° C.

EXAMPLE XI $Ph_6Pb_2$ (0.05 mole) was dissolved in 400 cm.$^3$ of chloroform; 0.05 mole of ozone was introduced at 15° C. After this, 0.1 mole of dry hydrogen chloride was introduced. The $Ph_3PbCl$ crystallized out immediately with a yield of 83% and a melting point of 206° C.

EXAMPLE XII $Ph_6Pb_2$ (0.05 mole) was dissolved in 400 cm$^3$ of chloroform; 0.05 mole of ozone was introduced at 15° C. Subsequently, 0.1 mole of benzylmercaptan $HSCH_2Ph$ was added. Recrystallization from ethanol gave 86% of $Ph_3PbSCH_2Ph$ with a melting point of 82–83° C.

EXAMPLE XIII $Ph_6Pb_2$ (0.05 mole) was dissolved in 400 cm.$^3$ of chloroform and 0.05 mole of ozone was introduced at 0° C. After that, 0.1 mole of thiophenol HSPh was added. Recrystallization from ethanol gave 73% of $Ph_3SPh$, and a melting point of 106–107° C.

In a number of cases, the solution showed a slight cloudiness after the introduction of the ozone. This cloudiness was filtered off. The residue was subjected to ignition and the lead content was determined. Calculated on the quantity of lead in the hexaorganodilead compound brought to reaction, the lead content amounted to no more than 5% in one instance and to less than that in all other cases. In many cases, no cloudiness appeared at all.

In order to get a very accurate determination, the whole of the reaction solution, after treatment with ozone and HX, may be evaporated to dryness. The residue is taken up in benzene, for instance, and dry hydrogen chloride is subsequently introduced at room temperature. The $R_3PbX$ compounds are then converted into $R_2PbCl_2$, which may easily be isolated and identified.

I claim:
1. A process for preparing triorganolead compounds of the general formula $R_3PbX$, comprising treating a hexaoranolead compound $R_6Pb_2$ with ozone and a compound HX in a solvent, wherein R is a radical selected from the group consisting of alkyl, aryl, aralkyl, and cycloalkyl radicals, and X is an anion easily bonded to lead.
2. A process as set forth in claim 1, wherein the ratio is approximately 1 mole of ozone and 2 moles of HX to 1 mole of $R_6Pb_2$.
3. A process as set forth in claim 1, wherein the HX is added to the compound $R_6Pb_2$ prior to adding the ozone.
4. A process as set forth in claim 1, wherein HX is acetic acid.
5. A process as set forth in claim 1, wherein HX is benzoic acid.
6. A process as set forth in claim 1, wherein HX is water.
7. A process as set forth in claim 1, wherein HX is HCl.
8. A process as set forth in claim 1, wherein HX is benzylmercaptan.
9. A process as set forth in claim 1, wherein HX is thiophenol.
10. A process as set forth in claim 1, wherein HX is imidazole.
11. A process as set forth in claim 1, wherein R is n-propyl.
12. A process as set forth in claim 1, wherein R is n-butyl.
13. A process as set forth in claim 1, wherein R is n-heptyl.
14. A process as set for in claim 1, wherein R is phenyl.
15. A process as set forth in claim 1 wherein the anionic radical X is acylate, halide, mercaptide, imidazolyl or hydroxyl.

References Cited

UNITED STATES PATENTS

| | | | |
|---|---|---|---|
| 3,270,042 | 8/1966 | Collier | 260—437 |
| 3,277,134 | 10/1966 | Collier et al. | 260—437 |
| 3,361,741 | 1/1968 | Shulman | 260—436 |

OTHER REFERENCES

Leeper et al.: Chemical Reviews, vol. 54, 1954 pp. 137, 142, 143–146.

Willemsens: Organolead Chemistry, Internat. Lead Zinc Res. Org., New York, 1964, pp. 41, 42, 49, 50.

Chemical Abstracts, vol. 65, p. 8955e (1966).

TOBIAS E. LEVOW, Primary Examiner

H. M. SNEED, Assistant Examiner

U.S. Cl. X.R.

260—414, 436, 437

PO-1050
(5/69)

UNITED STATES PATENT OFFICE
CERTIFICATE OF CORRECTION

Patent No. 3,555,038                    Dated   January 12, 1971

Inventor(s) Louis C. Willemsens

It is certified that error appears in the above-identified patent and that said Letters Patent are hereby corrected as shown below:

At column 3, line 9, "o-$NH_2C_6H_4OC$: m. 57-8°" should be -- o-$NH_2C_6H_4OCO$:  m. 57-8° --.

Signed and sealed this 25th day of May 1971.

(SEAL)
Attest:

EDWARD M. FLETCHER, JR.                 WILLIAM E. SCHUYLER, JI
Attesting Officer                        Commissioner of Patent: